United States Patent [19]

Reynolds

[11] Patent Number: 4,569,271

[45] Date of Patent: Feb. 11, 1986

[54] HYDRAULIC BOOSTERS FOR VEHICLE HYDRAULIC SYSTEMS

[75] Inventor: Desmond H. J. Reynolds, Sutton Coldfield, England

[73] Assignee: Lucas Industries Public Limited Company, Birmingham, England

[21] Appl. No.: 501,697

[22] Filed: Jun. 6, 1983

[30] Foreign Application Priority Data

Jun. 11, 1982 [GB] United Kingdom ............... 8216981
Feb. 23, 1983 [GB] United Kingdom ............... 8305060

[51] Int. Cl.[4] .................................... F15B 15/22
[52] U.S. Cl. ................................ 91/25; 91/391 R; 91/408; 91/422; 92/29
[58] Field of Search .............. 60/547.1, 548; 91/25, 91/392, 391 R, 408, 409, 422, 434, 24; 92/29

[56] References Cited

U.S. PATENT DOCUMENTS

| | | | |
|---|---|---|---|
| 2,957,311 | 10/1960 | Stelzer | 60/548 |
| 3,060,894 | 10/1962 | Dean, Jr. | 91/25 |
| 3,087,466 | 4/1963 | Tobias | 91/25 |
| 3,618,321 | 11/1971 | Moran | 60/548 |
| 4,173,171 | 11/1979 | Lange | 91/25 |
| 4,280,395 | 7/1981 | Shaw | 91/434 |
| 4,433,543 | 2/1984 | Thomas | 60/547.1 |

FOREIGN PATENT DOCUMENTS 2926392 1/1981 Fed. Rep. of Germany ........ 60/548

Primary Examiner—Abraham Hershkovitz
Attorney, Agent, or Firm—Oldham, Oldham & Weber Co.

[57] ABSTRACT

An hydraulic booster has a housing provided with a bore, an inlet connected to a source of pressure fluid, and an outlet connected to a reservoir for fluid, a boost piston being advanced in the bore in response to pressurisation of a boost chamber, the boost chamber being pressurized under the control of a valve mechanism operative in response to a load applied to an input member. Two connections are provided between the source and the boost chamber, both connections being closed when the booster is inoperative, and when the booster is operated the first connection is opened following initial movement of the input member, and the second connection is opened following initial movement of the boost piston in response to pressurization of the boost chamber. Thus the booster is in a closed center mode when inoperative, but operates in an open center mode. The connections are preferably controlled by valves. The input load may be applied in tension or compression.

14 Claims, 4 Drawing Figures

HYDRAULIC BOOSTERS FOR VEHICLE HYDRAULIC SYSTEMS

SPECIFIC DESCRIPTION

This invention relates to an hydraulic booster for a vehicle hydraulic system, of the kind comprising a housing provided with a bore, an inlet for connection to a source of hydraulic pressure, an outlet for connection to a reservoir for fluid, an input member, and a boost piston working in the bore, the boost piston being advanced in the bore in response to pressurisation of a boost chamber by fluid from the source, pressurisation of the boost chamber being controlled by control valve means operable in response to an input load applied to the input member, and arranged to move with the boost piston.

In order to facilitate installation in a limited space in a vehicle, it is desirable to make the housing of a booster of the kind set forth as short as possible, although the housing must be of sufficient length to accommodate the stroke of the boost piston, and the part of the boost piston which is necessarily located in the housing. Where a booster of the kind set forth is of the closed centre type, that is, where the boost chamber is not connected to the inlet when the booster is inoperative, the arrangement of the booster must allow for the inlet to be able to communicate with the booster chamber over the whole of the stroke of the boost piston, which increases the length of the part of the boost piston located in the housing. This problem can be overcome if the booster is of the open centre type, where the inlet is permanently connected to the boost chamber, but this type of booster has the disadvantage that the source is required to operate continuously to circulate fluid through the booster, even when the booster is inoperative.

According to our invention, in an hydraulic booster of the kind set forth, two connections are provided between the boost chamber and the source, both connections being closed when the booster is inoperative to prevent fluid flow from the source to the boost chamber, and when the booster is operated, the first connection is opened following initial movement of the input member in response to an applied load, and the second connection is opened following initial movement of the boost piston in response to pressurisation of the boost chamber.

Thus when the booster of our invention is inoperative, it can be considered to be a closed centre booster. However, the provision of the two connections between the source and the boost chamber means that when operative it must operate as an open centre booster. Thus our booster overcomes the disadvantages of both types of booster, since if it is considered as a closed centre booster the length can be reduced because of the two connections, and if it is considered as an open centre booster it does not require continuous operation of the source when it is inoperative.

Since the booster operates as an open centre booster, there is a permanent connection between the boost chamber and the reservoir, and the control valve means is operative to restrict the flow of fluid to the reservoir in order to pressurise the boost chamber.

Preferably, the first and second connections are provided between the inlet and the boost chamber, and are controlled by respective first and second valves, which are normally closed, and open to open the respective connections. The first and second valves may be incorporated in the control valve means.

Conveniently, the first valve is defined between the input member and the housing or the boost piston. The second valve is defined between the boost piston and the housing. The first valve may close again after the second valve has opened.

The input load for the booster may be applied through a push-rod, so that the input member acts in compression, and an output member, through which the output load acts, is also in compression. This is a common arrangement suitable for a braking system, where the booster actuates a master cylinder.

In one embodiment where the input member works in compression, the input member works in the bore in the housing, with the first valve defined between the input member and the housing, and the second valve defined between the boost piston and the housing. In this case the first valve will close again after the second valve has opened.

In another embodiment where the input member works in compression the input member works in a bore in the boost piston, the first valve being defined between the input member and the boost piston, and the second valve being defined between the boost piston and the housing. In this embodiment the first valve will remain open during operation of the booster.

In other vehicle systems, such as clutch actuating systems, it may be more convenient to apply the input load through a pull-rod, so that the input and output members act in tension.

In an embodiment where the input member works in tension, the input member works in a bore in the boost piston, the first valve being defined between the input member and the boost piston and the boost piston and the housing, and the second valve being defined between the boost piston and the housing. In this embodiment the first valve will close after the second valve has opened.

In any of the embodiments the boost piston may be separate from the output member, but connected to it through an adjuster means which allows adjustment of their relative positions.

The adjuster means is operative to change the effective length of a linkage, and may be incorporated where the booster is used in vehicle clutch or brake operating systems where it is necessary to alter the effective length of the linkage to compensate for friction lining wear of the clutch or brake.

The adjuster means comprises first and second relatively movable parts comprising the boost piston and output member respectively, and unidirectional locking means engageable between the parts, and operative to permit free relative movement of the parts in one direction, and to permit a limited amount of relative movement between the parts in the opposite direction, the parts then being locked together.

This arrangement enables the position of the output member relative to the boost piston to be adjusted, and thus the length of the linkage to be increased or decreased, thus allowing automatic adjustment of the linkage in service. Further it ensures that there is a predetermined amount of lost-motion in the linkage before the parts are locked together. This is of particular importance in clutch operating linkages where insufficient lost-motion can lead to rapid wear of the friction lining.

The locking means may be arranged to permit free movement of the parts relatively towards each other, and to limit the amount of relative movement of the parts away from each other, or vice versa.

The unidirectional locking means may comprise a wedge means. The wedge means preferably comprises one or more rollers or balls engaging between mutually inclined surfaces associated with the first and second parts. On relative movement of the parts in the said opposite direction, the parts firstly move relatively by the limited amount, and then are locked together by the wedge means. The wedge means is released on relative movement of the parts in the said one direction.

A manually operable means may be provided to disable the locking means to allow free relative movement of the parts in the said opposite direction. This enables the second part, the output member, to be moved into the required position relative to the boost piston during installation of the adjuster.

The disabling means preferably comprises a member mounted on a movable part of a resilient sealing means sealing the parts, the member being engageable with part of the locking means when the sealing means is manually deformed.

Some embodiments of our invention are illustrated in the accompanying drawings, in which FIG. 1 is a longitudinal section through an hydraulic booster;

Figure 1:
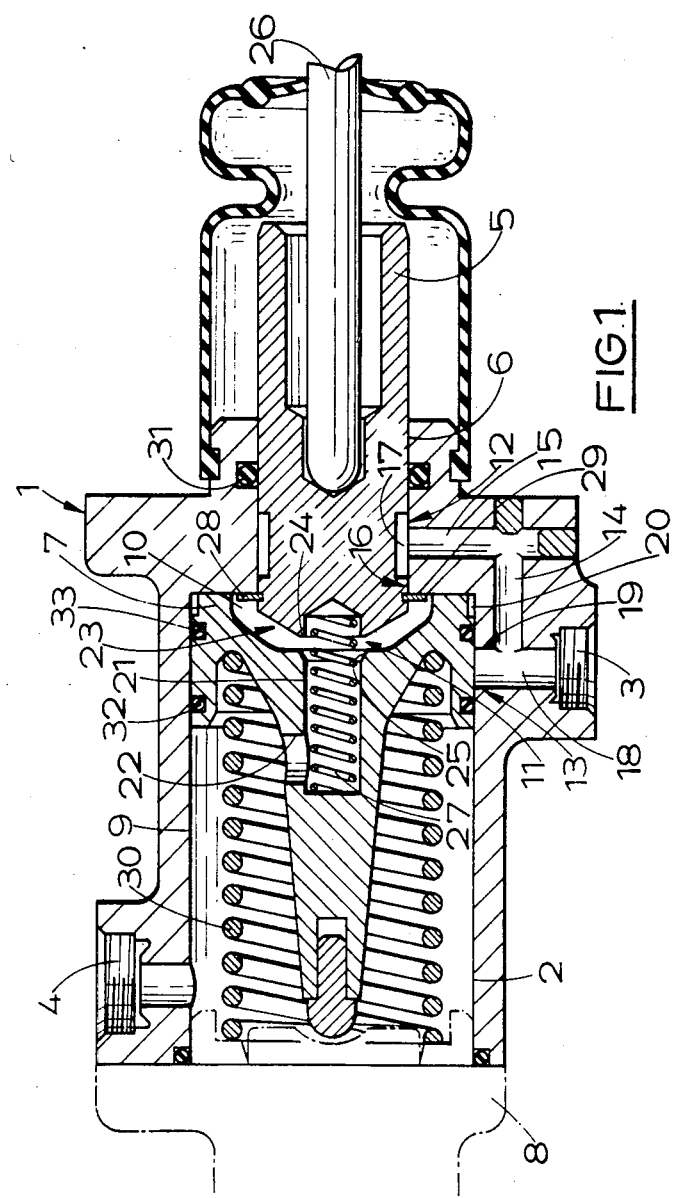

The booster shown in FIG. 1 of the drawings comprises a housing 1 provided with a longitudinal stepped bore 2, an inlet 3 for connection to a source of hydraulic pressure, suitably a pump or an accumulator (not shown) and an outlet 4 for connection to a reservoir for fluid (not shown). An input member in the form of a piston 5 works in a portion 6 of the bore 2 of smaller diameter. A boost piston 7 for actuating a master cylinder 8 (only part of which is shown) works in the bore portion 9 of larger diameter. The boost piston 7 is advanced in response to pressurisation of a boost chamber 10 by fluid from the source. Pressurisation of the boost chamber 10 is controlled by control valve means 11 operated in response to a load applied to the input piston 5.

The source 3 has two separate connections 12, 13, with the boost chamber 10 via the inlet 3, the connections being closed when the booster is inoperative. The first connection 12 has longitudinal and radial passages 14, 15 in the housing 1 leading from the inlet 3 to the bore portion 6, and communicates with the boost chamber 10 through a first normally closed valve 16 comprising an annulus 17 on the input piston 5 cooperating with the housing bore portion 6. When the input piston 5 is advanced the first valve 16 opens to allow the inlet 3 to communicate with the boost chamber 10 through the first connection 12. The second connection 13 has a radial passage 18 leading from the inlet 3 to the bore portion 9, and communicates with the boost chamber 10 through a second normally closed valve 19 comprising an annulus 20 on the boost piston 7 cooperating with bore portion 9. When the boost piston 7 is advanced the second valve 19 opens to allow the inlet 3 to communicate with the boost chamber 10 through the second connection 13.

The boost chamber 10 is in permanent communication with the outlet 4 through axial passage 21 and radial passage 22 in the boost piston 7, and the bore portion 9. In operation, fluid from the source is admitted to the boost chamber 10 via the first and second connections. Fluid flow is controlled by the first and second valves, and by a control valve 23 comprising a forward portion 24 of the input piston 5 which cooperates with a seat 25 on the boost piston 7 to restrict flow from the boost chamber 10 through the passage 21. The first and second valves 16, 19 together with the control valve 23 therefore form the control valve means 11.

The input piston 5 is operated by a pedal (not shown) through a push-rod 26, and is biassed by a spring 27 into the retracted position shown, in which a circlip 28 on the piston 5 engages a shoulder 29 in the bore 2. The boost piston 7 is also biassed into its retracted position by a spring 30. An elastomeric seal 31 is provided in the bore portion 6 to seal the rearward end of the input piston 5. A seal 32 on the boost piston 7 seals the forward end of the boost chamber in the bore 2, while a seal 33 on the boost piston 7 seals the second connection 13 from the boost chamber 10 when the booster is inoperative. Seals 32 and 33 may be of cast iron.

In the inoperative position shown the first and second connections 12, 13 between the source and the boost chamber 10 are closed by the first and second valves 16, 19, and the boost chamber 10 is connected to the outlet 4. Thus when the booster is inoperative it can be seen to be of the closed centre type.

In operation, a load is applied to the input piston 5 from the pedal. The input piston 5 is advanced against the force in the spring 27, and the forward portion 24 restricts the passage 21. This movement opens the first valve 16, to allow fluid to flow from the inlet 3 to the boost chamber 10 through the first connection 12. The fluid flows out to the outlet through passage 21, but pressure builds up in the boost chamber 10 due to the restriction by valve 23. Pressure in the boost chamber 10 acts on the boost piston 7 to advance it, against the force in the spring 30, to actuate the master cylinder 8. The pressure in the boost chamber 10 also acts on the input piston 5 to transmit a reaction back to the pedal to provide "feel" for the operator. As the boost piston 7 advances, the second valve 19 opens, to permit fluid to flow into the boost chamber 10 from the inlet 3 via the second connection 13. The input piston 5 advances with the boost piston 7, and may reach a point, after the second valve 19 has opened, at which the first valve 16 closes again.

When the force generated by the boost pressure acting on the input piston 5 equals the applied load, the input and boost pistons separate slightly, and the booster is then in its balanced or "null" position.

When the input load is reduced the boost pressure and the spring 27 act to move the input piston 5 rearwardly, which opens the valve 23 to allow more fluid flow through passage 21, which reduces the boost pressure. The boost piston 7 is then moved rearwardly by the spring 30 and the reaction from the master cylinder 8. If the input load has not been removed altogether, the booster adopts a new balanced position, and if it has been removed totally, the parts return to the retracted positions shown.

The provision of the two connections 12, 13 means that the booster cannot operate as a closed centre booster. In operation therefore, the booster acts as an open centre type booster.

The booster of FIG. 1 is particularly suitable for use in a tractor or other agricultural vehicle, and is designed to operate at relatively low pressures, of about 14 to 28 bars, which may be provided by a transmission lubrication system.

Figure 2:
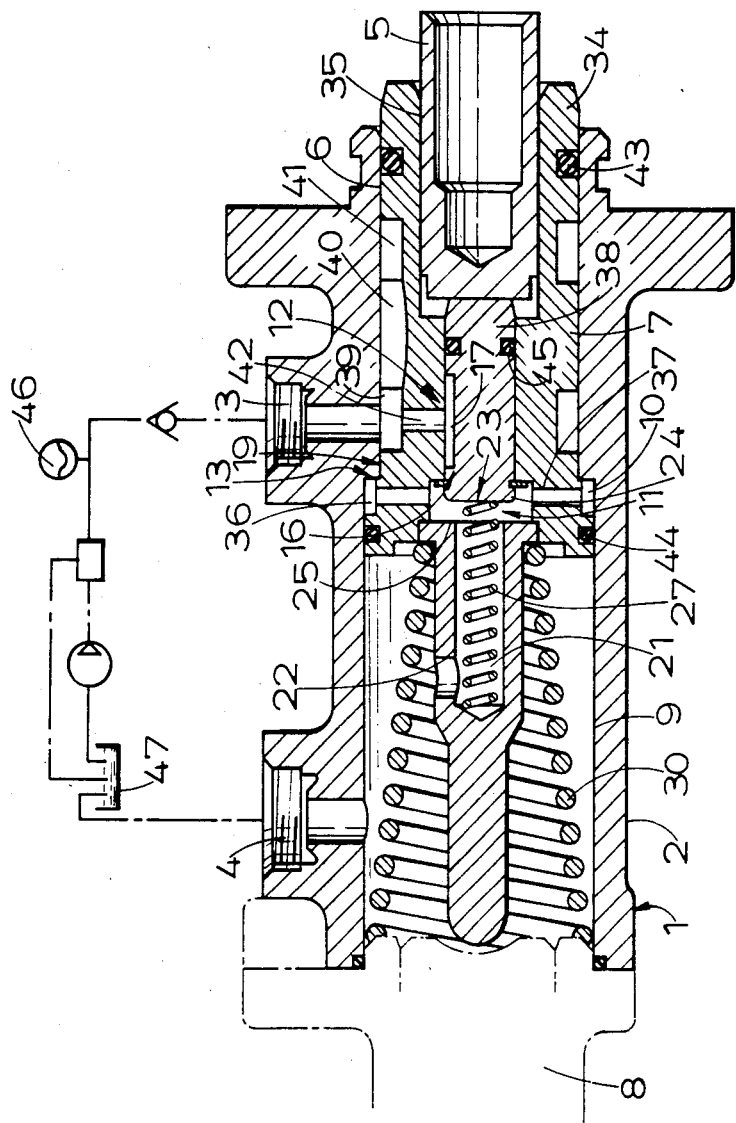
FIG. 2 is a similar section through a modified booster.

FIG. 2 shows a modified booster which is designed to operate at much higher pressures, up to 200 bars, which may be provided, on an agricultural vehicle, by the hydraulic implement circuit.

Thus in the booster of FIG. 2, the effective area of the boost piston 7 on which the boost pressure acts is reduced. The boost piston 7 is stepped, with a rearwardly-extending portion 34 of smaller diameter working in the housing bore portion 6, and is itself provided with a stepped bore 35. The boost chamber 10 is defined at a step in the boost piston 7, such that the effective area of the boost chamber is defined by an annulus 36. The annular portion of the boost chamber communicates with the other portion, located in the bore 34, through a diametral passage 37 in the boost piston.

The input piston 5 works in the rearward portion of the bore 35, and acts on a separate valve member 38 which also works in the bore 35. The valve member 38 is provided with the control valve portion 24.

The inlet 3 communicates with an annulus 39 on the boost piston portion 34, the annulus being connected by a slot 40 to a further, rearward, annulus 41. The first connection 12 is provided through the annulus 39, a radial passage 42 in the boost piston 7, and the first valve 16, comprising the annulus 17 on the valve member 38 which cooperates with the piston bore 35. When the valve member 38 is advanced the first valve 16 opens to allow the inlet 3 to communicate with the boost chamber 10. The second connection 13 is provided through the annulus 39, which cooperates with the bore portion 6 to form the second valve 19. When the boost piston 7 is advanced the second valve opens to allow communication between the annulus 39 and the annular portion 36 of the boost chamber 10. Seals 43 and 44 seal the boost chamber 10, and a seal 45 is provided on the valve member 38. The accumulator 46 and reservoir 47 are also shown in FIG. 2.

In operation, a load applied to the input piston 5 advances the valve member 38, to restrict flow through passage 21 and to open communication between the inlet 3 and the boost chamber 10 through the first connection 12. Fluid flows to the outlet 4, but the boost chamber 10 is pressurised due to restricted flow through valve 23. The boost piston 7 is therefore advanced to actuate the master cylinder 8, and the second valve 19 is opened to allow fluid to flow into the boost chamber 10 through the second connection 13. The input piston 5 and valve member 38 advance with the boost piston 7, so that in this embodiment the first valve 16 does not close again.

The remainder of the construction and operation of the booster of FIG. 2 is similar to that of FIG. 1 and corresponding reference numerals have been applied to corresponding parts.

Figure 3:
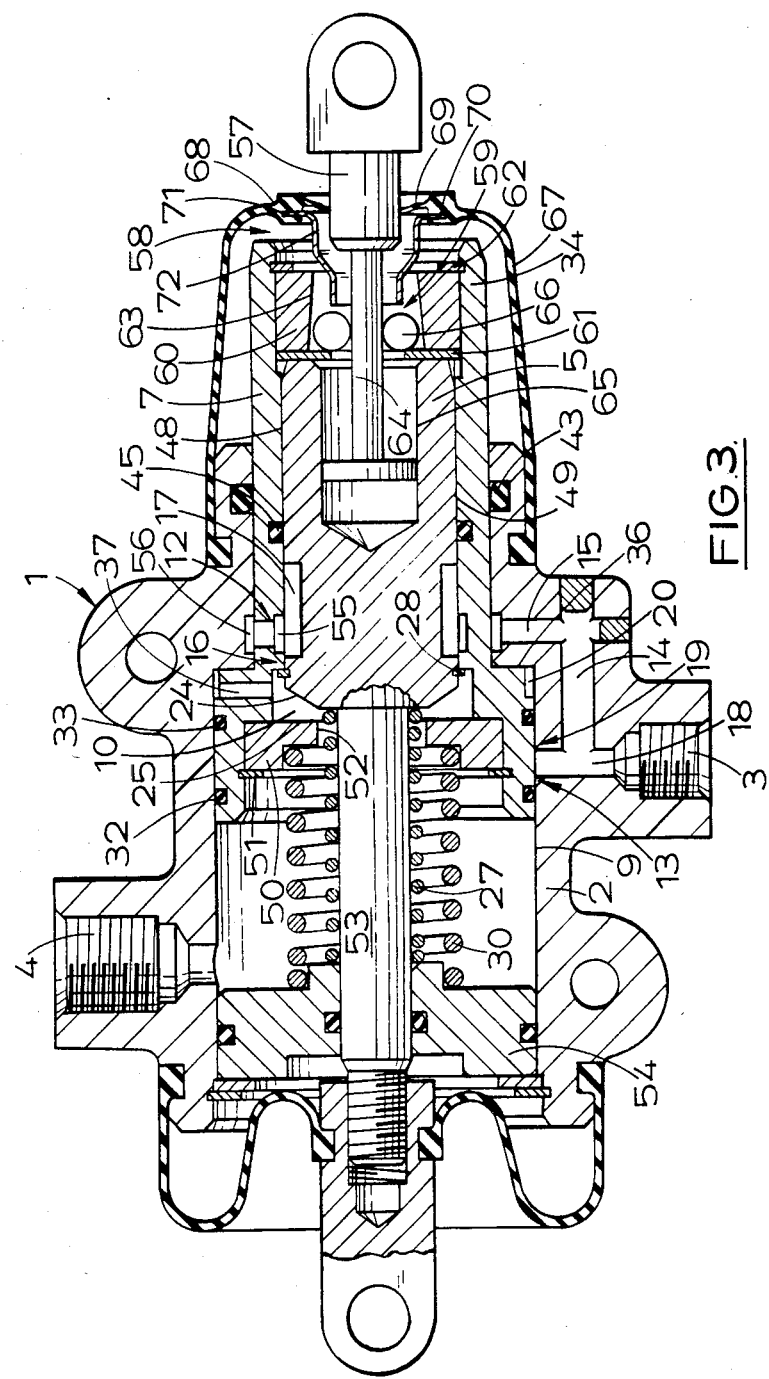
FIG. 3 is a similar section through a further booster incorporating an adjuster means.

In the boosters of FIGS. 1 and 2 the input load is applied through the push-rod 26, so that the input and output members act in compression. This arrangement is particularly suitable for a vehicle braking system. FIG. 3 shows a booster where the input load is applied through a pull-rod, so that the input and output members act in tension. This arrangement is particularly suitable for a vehicle clutch actuating system, such as that shown in FIG. 4.

The booster of FIG. 3 is similar in construction to those of FIGS. 1 and 2, and corresponding reference numerals have been applied to corresponding parts.

In the booster of FIG. 3 the boost piston 7 is of stepped outline, and has a stepped through-bore 48. The boost chamber 10 has an annular effective area, defined by annulus 36, and the annular portion communicates with a portion in the bore 48 through annulus 20 and radial passage 37. The input piston 5 is also of stepped outline, and extends forwardly of the boost piston 7 for connection to a pull-rod (see FIG. 4). The boost piston 7 has the rearward extension 34, in the bore portion of which a larger diameter portion 49 of the input piston 5 works. The boost piston 7 also has an abutment member 50 of L-section located by a circlip 51 at a step in the bore 48 near the forward end of the boost piston 7, and the member 50 has an aperture 52 by which the boost chamber 10 communicates with the outlet 4. A smaller diameter portion 53 of the input piston 5 also passes through the aperture 52, and works in an end member 54 located in the bore portion 9. The portion 53 of the input piston 5 is screwed into a coupling member for connection with the pull-rod. The spring 30 works between the abutment member 50 and the end member 54, while the spring 27 works between the end member 54 and the input piston 5.

The first and second connections are similar to those shown in FIG. 1, with the first connection 12 also having an annulus 55 and radial passage 56 in the boost piston 7 to connect the annulus 17 to the passage 15. The first valve 16 is defined by the radial passage 56 cooperating with the passage 15, and the annulus 17 cooperating with the piston bore 48. The second valve 19 comprises the annulus 20 on the boost piston 7, from which the radial passage 37 leads, cooperating with the bore portion 9.

The remainder of the control valve means 11—the control valve 23—is formed by a shoulder portion 24, at the step in diameter of the input piston 5, which cooperates with a seat 25 on the member 50.

An output member 57 is located at the rearward end of the booster, and is coupled to the boost piston 7 by an adjuster means 58.

The adjuster means 58 has first and second relatively movable parts comprising the boost piston 7 and output member 57 respectively, and a unidirectional locking means 59 engageable between the parts which allows free relative movement of the parts in one direction, and a limited amount of relative movement of the parts in the opposite direction, the parts then being locked together.

The locking means 59 is a wedge means, having a sleeve 60 located in the boost piston bore 48 by a washer 61 and a spring clip 62. The sleeve 60 has a frusto-conical internal surface 63 which tapers towards the output member 57. The output member 57 has a forwardly extending rod 64 which extends through the sleeve 60 into a blind bore 65 in the input piston 5. A number of balls 66 are located between the frusto-conical surface 63 and the rod 64. The diameters of the balls are approximately the same as the mean distance of separation of the mutually inclined surfaces 63 and 64. The balls 66 are able to engage both surfaces, locking the boost piston 7 and the output member 57 together. Thus movement of the parts 7 and 57 in one direction (towards each other) is allowed, as the balls 66 do not engage both surfaces, but only a limited amount of relative movement of the parts 7 and 57 in the opposite direction (away from each other) is permitted, as this movement causes the balls 66 to engage the surfaces 63 and 64 to lock the parts together. Once locked, the locking means 59 can be released by movement in the one direction.

The boost piston 7 and the output member 57 are sealed by a resilient sealing means in the form of an annular synthetic rubber gaiter 67. One end of the gaiter 67 is located in the housing 1, and the other end is provided with a thickened sleeve 68, from which projects an inwardly directed lip 69 which engages sealingly with the output member 57. The sleeve 68 has an annular recess 70, which receives a flange 71 of an annular member 72. The member 72 is of stepped outline, and encircles the rod 64, extending into the sleeve 60. There is a clearance between the member 72 and the rod 64, and between the member and the sleeve 60. Deformation of the gaiter sleeve 68 inwardly moves the member 72 inwardly, causing it to hold the balls 66 in an inoperative position against the washer 61. The member 72 therefore provides manually-operable disabling means for disabling the locking means 59 to enable the relative position of the boost piston 7 and output member 57 to be adjusted easily, for example, during installation.

Figure 4:
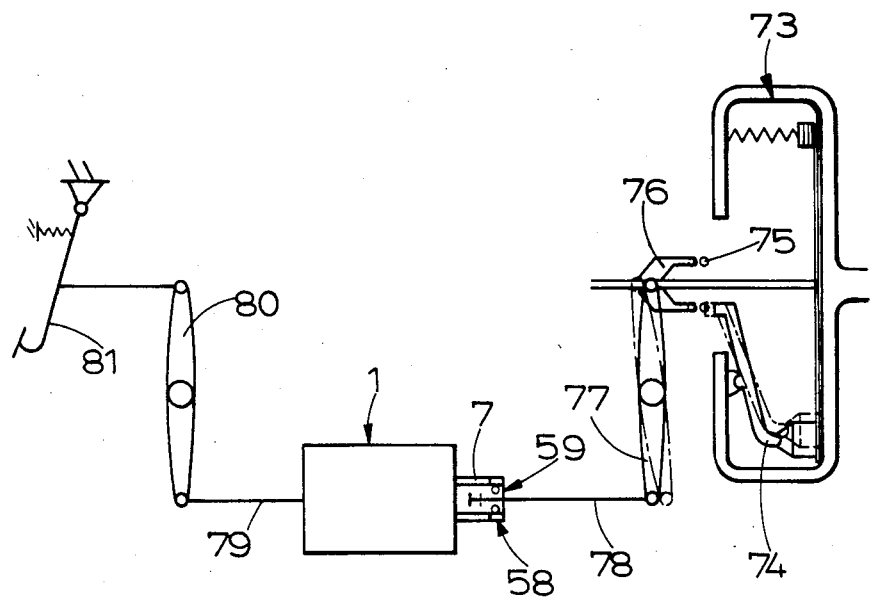
FIG. 4 is a schematic diagram showing the booster of FIG. 3 incorporated in a clutch operating linkage for a vehicle.

The booster is incorporated in the clutch operating linkage of FIG. 4. A clutch 73 has an operating lever 74, which is connected through a thrust washer 75 to a slidable fork 76. The fork 76 is attached to one end of a pivoted lever 77, whose other end is attached to the output member 57 through a rod 78. The input member 5 of the booster is connected via a pull-rod 79 to one end of a pivoted lever 80, the other end of which is connected to a spring-loaded pedal 81.

Operation of the booster of FIG. 3 is very similar to that of FIGS. 1 and 2. A tension load applied to the input piston 5 operates the control valve 23 and opens the first valve 16 to allow fluid to flow into the boost chamber 10 through the first connection 12. Consequent pressurisation of the boost chamber 10 acts on the boost piston 7 to advance it, and the boost piston 7 acts through the locking means 59 to advance the output member 57 to actuate the clutch. The operation of the adjuster means 58 is described in detail below. As the boost piston 7 advances, the second valve 19 opens. The input piston 5 advances with the boost piston 7, and may reach a point, after the second valve 19 has opened, at which the first valve 16 closes again, as the passage 56 on the boost piston 7 moves out of registry with the passage 15.

On reduction of the input load, the boost piston 7 is moved rearwardly by the reaction from the clutch acting through the output member 57.

The provision of the two connections between the source and the boost chamber means that the boosters are of the open centre type when operative, but of the closed centre type when inoperative, which enables them to be of reduced length, but does not require continuous circulation of fluid.

Operation of the adjuster means will now be described in relation to the linkage shown in FIG. 4. A load on the pedal 81 acts through the lever 80 and pull-rod 79 to operate the booster, moving the boost piston 7 relatively away from the output member 57. Thus, after the limited amount of lost-motion for this direction permitted by the locking means 59 has been taken up, the balls 66 lock the boost piston 7 and the output member 57 together, so that further movement of the boost piston 7 also moves the output member 57. This acts through the rod 78, the lever 77, the fork 76 and the thrust washer 75 to move the operating lever 74 to disengage the clutch 73.

On removal of the pedal load the clutch return spring (which is stronger than the boost piston return spring 30 and the pedal return spring) acts through the linkage to move the output member 57 back to its retracted position, which is in a direction relatively away from the boost piston 7. This means that the locking means 59 remain operative so that the boost piston 7 is also moved towards its retracted position. Because of the initial lost-motion, the output member 57 reaches its retracted position first, and the boost piston 7 is then moved back to its retracted position (by the spring 30), which is in a direction relatively towards the output member 57. This therefore releases the locking means 59.

If no adjustment of the linkage is necessary the members return to their initial position. If however wear of the clutch makes it necessary to increase the length of the linkage, the return travel of the output member 57 is greater, so that the output member is returned to a new retracted position. The initial lost-motion is chosen so that the boost piston 7 has not reached its retracted position at this point, so that the boost piston 7 still releases the locking means 59 as it returns to its retracted position. The lost-motion permitted by the locking means 59 is restored, so that therefore the adjuster operates automatically in service. The dotted lines in FIG. 4 show the positions adopted by the parts of the linkage when the clutch lining is partly worn.

In a modification of the locking means 59, the mutually inclined surfaces 63 and 64 on the sleeve 60 and rod 64 may be flat, to accommodate rollers instead of the balls 66.

The adjuster means 58 may be incorporated directly in a linkage, rather than in a booster, and of course could be arranged to operate in a "push" rather than "pull" system.

I claim:

1. An hydraulic booster for a vehicle hydraulic system comprising a housing, means defining a bore in said housing, an inlet for connection to a source of hydraulic pressure, an outlet for connection to a reservoir for fluid, an input member, a boost piston working in said bore, means defining a boost chamber, said boost piston being advanced in said bore in response to pressurisation of said boost chamber by fluid from said source, and control valve means for controlling pressurisation of said boost chamber, said control valve means being operable in response to an input load applied to said input member, and said control valve means being arranged to move with said boost piston, wherein first and second connections are provided between said boost chamber and said source, both said connections being closed when said booster is inoperative to prevent fluid flow from said source to said boost chamber, and when said booster is operated, said first connection is opened following initial movement of said input member in response to an applied load, and said second connection is opened following initial movement of said boost piston in response to pressurisation of said boost chamber.

2. An hydraulic booster as claimed in claim 1, wherein said first and second connections are provided between said inlet and said boost chamber, and respective first and second valves control said first and second connections, said valves being normally closed, and said valves opening to open said respective connections.

3. An hydraulic booster as claimed in claim 2, wherein said first and second valves are incorporated in said control valve means.

4. An hydraulic booster as claimed in claim 2, wherein said first valve is defined between said input member and said housing, and said second valve is defined between said boost piston and said housing.

5. An hydraulic booster as claimed in claim 2, wherein said input member works in compression, and said input member works in said bore in said housing, with said first valve defined between said input member and said housing, and said second valve defined between said boost piston and said housing, the arrangement being such that said first valve closes again after said second valve has opened.

6. An hydraulic booster as claimed in claim 2, wherein said booster piston is provided with a bore, and said input member works in compression, and works in said bore in said boost piston, said first valve being defined between said input member and said boost piston, and said second valve being defined between said boost piston and said housing, the arrangement being such that said first valve will remain open during operation of said booster.

7. An hydraulic booster as claimed in claim 2, wherein said boost piston is provided with a bore, and said input member works in tension, and works in said bore in said boost piston, said first valve being defined between said input member and said boost piston and said boost piston and said housing, and said second valve being defined between said boost piston and said housing, the arrangement being such that said first valve closes after said second valve has opened.

8. An hydraulic booster as claimed in claim 1, wherein an output member is incorporated, an output load from said booster acting through said output member, said boost piston being separate from said output member, and said boost piston and said output member being connected by an adjuster means which allows adjustment of their relative positions.

9. An hydraulic booster as claimed in claim 8, wherein said adjuster means comprises first and second relatively movable parts comprising said boost piston and said output member respectively, and undirectional locking means engageable between said parts, and operative to permit free relative movement of said parts in one direction, and to permit a limited amount of relative movement between said parts in the opposite direction, said parts then being locked together.

10. An hydraulic booster as claimed in claim 9, wherein said locking means are arranged to permit free movement of said parts relatively towards each other, and to limit the amount of relative movement of said parts away from each other.

11. An hydraulic booster as claimed in claim 9, wherein said undirectional locking means comprises a wedge means, comprising one or more rollers or balls engaging between mutually inclined surfaces associated with said first and second parts.

12. An hydraulic booster as claimed in claim 9, wherein a manually operable disabling means is provided to disable said locking means to allow free relative movement of said parts in the said opposite direction.

13. An hydraulic booster as claimed in claim 12, wherein said parts are sealed by a resilient sealing means, said sealing means having a movable part, and said disabling means comprises a member mounted on said movable part of said resilient sealing means, said member being engageable with part of said locking means when said sealing means is manually deformed.

14. An hydraulic booster as claimed in claim 2, wherein said first valve is defined between said input member and said boost piston, and said second valve is defined between said boost piston and said housing.

* * * * *